US006721857B2

(12) United States Patent
Cochran et al.

(10) Patent No.: US 6,721,857 B2
(45) Date of Patent: Apr. 13, 2004

(54) FLEXIBLE ALLEGIANCE STORAGE AND COMPUTING ARCHITECTURE

(75) Inventors: Robert A. Cochran, Roseville, CA (US); David A. Robinson, Loomis, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 358 days.

(21) Appl. No.: 10/002,671

(22) Filed: Oct. 23, 2001

(65) Prior Publication Data

US 2003/0079092 A1 Apr. 24, 2003

(51) Int. Cl.[7] .............................................. G06F 13/00
(52) U.S. Cl. ........................... 711/147; 711/6; 711/153; 711/203
(58) Field of Search ............................ 711/6, 147, 153, 711/203

(56) References Cited

U.S. PATENT DOCUMENTS 5,367,637 A * 11/1994 Wei .............................. 710/56
6,578,129 B1 * 6/2003 da Silva Junior et al. .... 711/209

* cited by examiner

Primary Examiner—Reba I. Elmore (57) ABSTRACT

A virtual storage and computing device includes an array control processor, a virtual device blueprint and a transceiver. Shared and cache memory are linked to the array control processor. The array control processor uses a wireless link to request additional resources from at least one component selected from the group of disk controllers, disk drives, cache memory, shared memory and channel adapters to assemble a virtual device described by the virtual device blueprint. The shared memory and the cache memory have hardwired and/or wireless links to the array control processor. The array control processor receives the virtual device blueprint from a host computer that is linked to the array control processor using a channel adapter or via a wireless link between a host computer and the array control processor.

20 Claims, 6 Drawing Sheets

FLEXIBLE ALLEGIANCE STORAGE AND COMPUTING ARCHITECTURE

FIELD OF THE INVENTION

The present invention relates to storage and computing systems, and more particularly to flexible storage and computing systems.

BACKGROUND OF THE INVENTION

Figure 1:
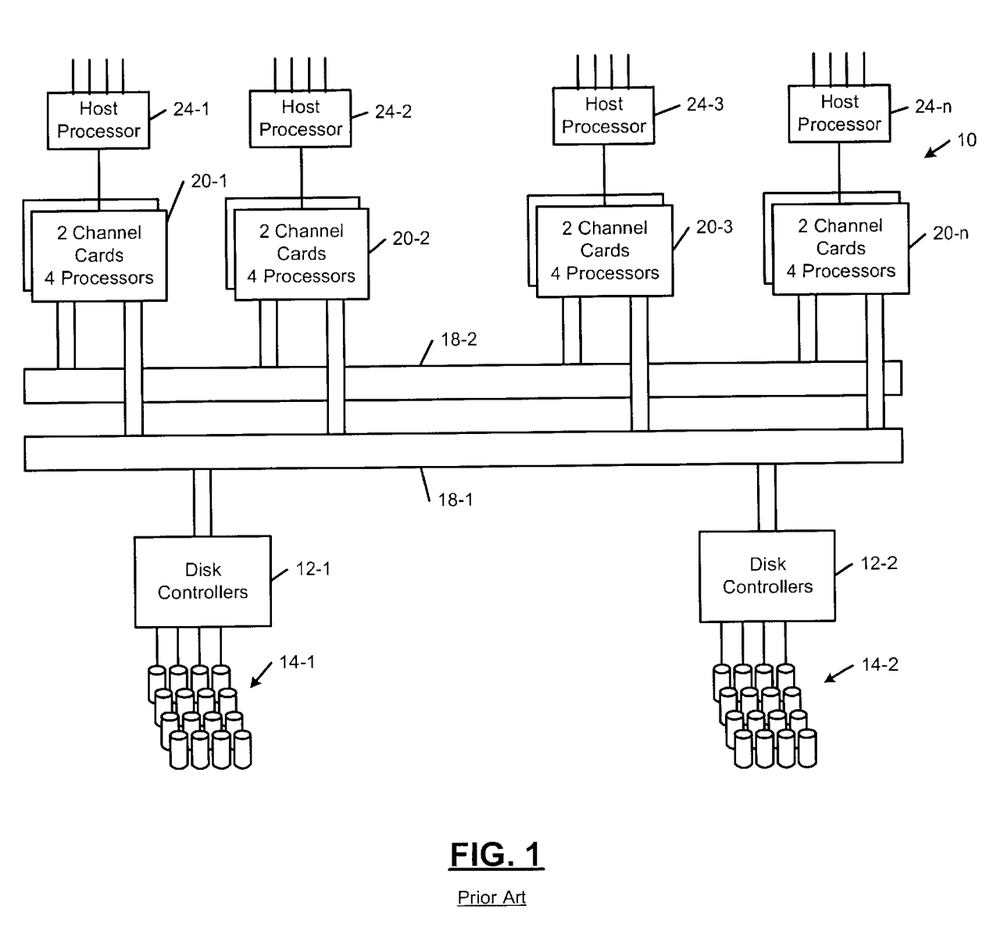
FIG. 1 is a functional block diagram of a storage architecture according to the prior art.

When designing and building complex electronic systems such as storage arrays or computer systems, the designer typically begins with the architecture. The architecture of the system defines the function of each component and the communication paths between the components. Referring now to FIG. 1, a conventional storage architecture 10 that provides 2×360 Mb/s is illustrated and typically includes one or more disk controllers 12-1, 12-2 . . . , 12-n that control and are directly connected to one or more disk drives 14-1, 14-2, . . . , 14-n. The disk controllers 12 are directly connected to one or more data buses 18-1, 18-2, . . . 18-n. Channel cards/processors 20-1, 20-2, 20-3, . . . and 20-n are also connected to the data buses 18.

The disk drives 14 employ internal rotating magnetic storage or other electronic storage media to save/retrieve data. The disk controllers 12 fulfill read/write requests to/from cache memory (not shown). One or more host computer systems are connected to the storage architecture 10 using one or more host interface processors 24-1, 24-2, 24-3 . . . and 24-n.

While the storage architecture 10 works well when the functional requirements of the storage architecture 10 remain relatively static, the storage architecture 10 is not capable of handling functional changes without a redesign. In other words, the storage architecture is relatively fixed, inflexible, and capable of only very limited expansion. The data busses have pre-defined (hardware limited) throughput, expandability and component connectability. The individual components of the storage architecture 10 such as the channel processors 20, cache memory, disk controllers 12 and disk drives 14 also contain internal processing, storage and communication limitations that must be accommodated.

All of the components of the storage architecture 10 have very constrained functionality. The components limit the types of devices that may request service and the resources that are available to provide the requested service. For example, the disk controller 12 receives requests via a narrowly defined application protocol interface (API) to save/retrieve data. The disk controller 12 services the requests via disk drives 14 that are hardwired to the disk controller 12. The disk drives 14 can only respond to a predefined program interface such as small computer system interface (SCSI).

Due to the need for instant capacity on demand (ICOD) in the computer storage industry, hot spare disks at a customer's site are usually required. Hot spare disks can account for 25% of a $2,000,000 disk array. In other words, approximately $500,000 of the disk array is idle and not returning value to the owner. Some data centers have ten $2,000,000 disk arrays. These data centers typically have approximately $5,000,000 in unused disk array equipment at a given time. The unused disk array equipment occupies raised floor space, consumes power, and generates heat. In addition, the unused disk array equipment provides no return on assets (ROA) value other than insurance against future storage needs.

SUMMARY OF THE INVENTION

A virtual storage and computing device according to the present invention includes an array control processor that includes a transceiver and that stores a virtual device blueprint. Shared memory is linked to the array control processor. The array control processor uses a wireless link to request additional resources from at least one component selected from the group of disk controllers, disk drives, cache memory, shared memory and channel adapters to assemble a virtual device described by the virtual device blueprint.

According to other features of the invention, the shared memory and cache memory are hardwired and/or wireless links to the array control processor. The virtual device blueprint defines a disk array. The array control processor includes firmware that stores the virtual device blueprint.

According to still other features of the invention, the array control processor receives the virtual device blueprint from a host computer that is linked to the array control processor using a channel adapter. Alternately, the array control processor receives the virtual device blueprint via a wireless link between a host computer and the array control processor.

In still other features, the array control processor transmits a request for a disk controller having first specifications. First and second disk controllers respond to the request and meet the first specifications. The array control processor selects one of the first and second disk controllers based on transmission power requirements of the first and second disk controllers.

In yet other features, the array control processor transmits a first request for a disk controller having first specifications. A third disk controller responds to the request by indicating availability of the third disk controller and by indicating that the third disk controller does not yet meet the first specifications. The third disk controller transmits a second request for available disk drives to obtain the requested specifications.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention provides a storage and computing architecture that quickly reconfigures via wireless connections between components. Additional components can be recruited for service within a prescribed distance, for example within the same rack, room, building, campus, or city.

For example, depending on the application profile, a disk array can be assembled "on-the-fly" to consist of 51, 512 or 5120 disk drives without requiring a system or architecture redesign. The disk array components are individually powered, racked and recruited. The disk array components participate via dedicated wireless connections. The storage and computing architecture according to the present invention is a significant improvement over conventional static storage and computing architectures as will be described more fully below.

Figure 2A:
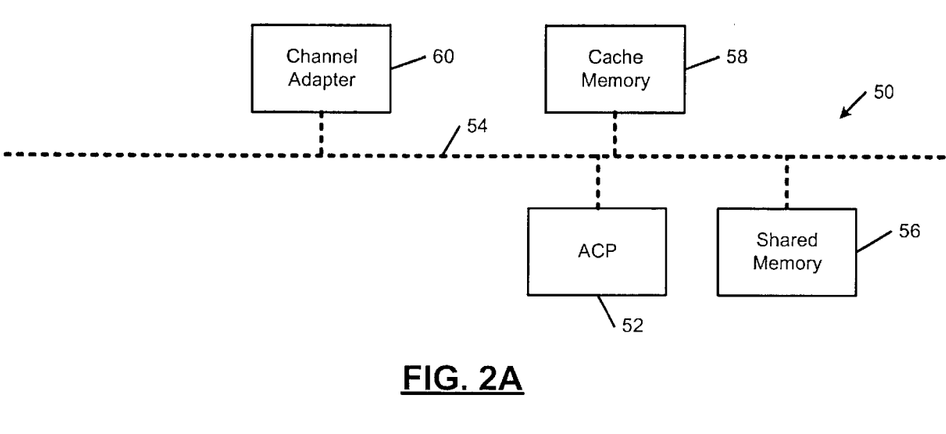
FIG. 2A is a functional block diagram of a base module that forms a virtual storage device and that employs wireless links between base module components according to the present invention.

Referring now to FIG. 2A, a first exemplary base module 50 is shown and preferably includes an array control processor (ACP) 52 that is connected by wireless connections 54 to shared memory 56, cache memory 58, and channel adapter 60 components. The ACP 52 recruits additional shared memory 56, cache memory 58, and channel adapters 60 components if needed via one or more additional wireless links to accommodate changing storage demands. In addition, the ACP 52 recruits one or more disk controllers (not shown) with disk drives (not shown) if needed via one or more additional wireless links to accommodate changing storage demands as will be described below.

Figure 2B:
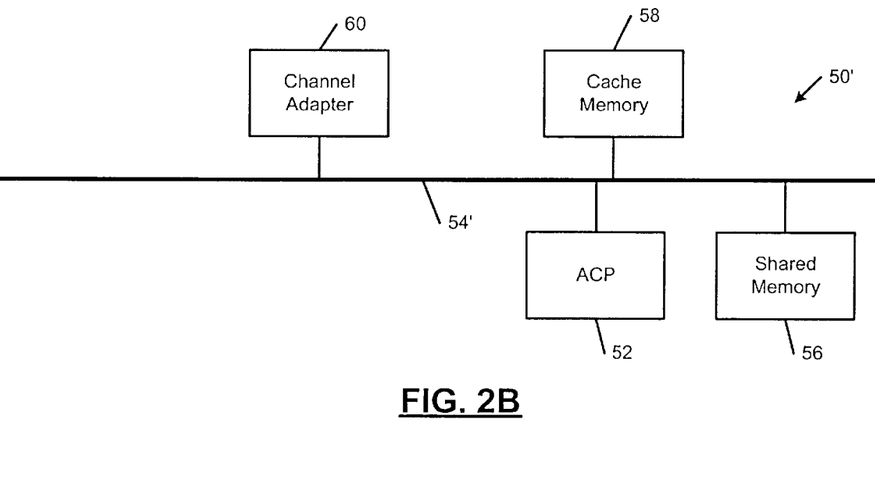
FIG. 2B is a functional block diagram of a base module that forms a virtual storage device and that employs hardwired links between base module components according to the present invention.

Referring now to FIG. 2B, reference numbers from FIG. 2A have been used in FIG. 2B where appropriate to identify similar elements. A second exemplary base module 50' is shown. The operation of the components 52, 54, 56 and 60 are the same as those in FIG. 2A except that the components are hardwired instead of wireless. The ACP 52 recruits additional shared memory 56, cache memory 58, and channel adapter 60 components if needed via one or more additional wireless links. In addition, the ACP 52 recruits one or more disk controllers with disk drives if needed via one or more additional wireless links.

Channel adapters 60 provide a connection between the base module 50 and one or more host computers. Cache memory 58 is high-speed memory that is used as a fast access data staging area. Disk controllers (not shown) are sub-systems that fulfill data read/write requests from/to cache memory 58 and the disk drives (not shown) via hardwired or wireless connections. Disk drives are storage devices utilizing internal rotating magnetic storage or other forms of electronic or optical storage to store/retrieve data for the disk controller. The disk controllers and disk drives typically employ the SCSI protocol interface. Shared memory is used as a shared memory pool by one or more sub-components in the storage or computing system using a common hardwired and/or wireless data bus 54 or 54'.

The ACP 52 preferably includes a virtual device blueprint (VDB) that is a description of a virtual storage and/or computing device that is to be created by the base module 50. The VDB is host downloaded via one or more channel adapters 60. Alternately, the VDB is stored in the base module 50 (for example stored in firmware). The base module 50 recruits the necessary components that are not already hardwired from components that are queried via wireless requests. The available components respond or volunteer via wireless communications. The responding components are selected if the components possess the requisite speed, storage abilities and/or other requested attributes.

For example, the VDB contains information to create a disk array with one disk controller fronting 12 73 GB disks; 512 MB of shared memory; 2 GB of cache memory; and two channel controllers for host connections. The base module 50 contains firmware containing the VDB or the VDB is downloaded from a host computer. The base module recruits disk controllers, additional cache memory and disk drives as needed.

The virtual storage device is built using the base module 50 as a starting point. For a disk array, an appropriate base module 50 includes the array control processor 52 and the shared memory (at least a minimum amount). The VDB is downloaded from a host computer through wireless or hardwired connections or retrieved from firmware in the base module 50. Using the components that the base module 50 already controls, the base module 50 recruits and either shares and/or takes ownership of the remaining components that are required by the VDB.

For example, the VDB and the base module 50 need to recruit a disk controller. The recruited disk controller needs to recruit additional disk drives. The VDB also needs to recruit an additional 512 MB of shared memory 56 and an additional 1 GB of cache memory 58 for each recruited disk controller.

When multiple components volunteer, the base module 50 selects the components that meet the specifications. When multiple components meet the requested specifications, the base module 50 selects the component that requires the minimum transmitter signal power. The minimum transmitter signal power can be established by data quality tests that are preformed at reducing power levels, by using GPS proximity sensors or by any other suitable method. If the virtual storage device was originally requested by a host computer, the base module 50 preferably reports the level of recruiting success to the host computer. If ordered by the host computer, the base module 50 secures ownership of all components and the wireless and/or hardwired links that are required. Likewise, if the host computer is not satisfied with the virtual storage device that was built, the base module 50 releases some or all of the wireless and/or hardwired links and the components that were reserved.

Components such as the cache and shared memory, the disk controllers, the channel adapters and the disk drives that are not hardwired to other devices have as many wireless transceivers as are reasonably expected to be needed. For example, a volunteering disk controller has all of the single or ganged transceivers that are necessary to deliver the desired data rate for the disk drives (e.g. up 32) to/from cache memory 58. The disk drives are connected using hardwired and/or wireless links.

The wireless transceivers in the components preferably employ a protocol such as Bluetooth, 802.11b or other suitable wireless protocols. Specialized, higher bandwidth transceivers with multiple frequencies, variable range (i.e. power level) and data encryption are preferably employed.

Each volunteering component preferably includes a transceiver operating at a shared or party line frequency. Once the base module 50 accepts the services of the volunteering component, the base module 50 and the voluntary component select an exclusive frequency for further operation.

Figure 3:
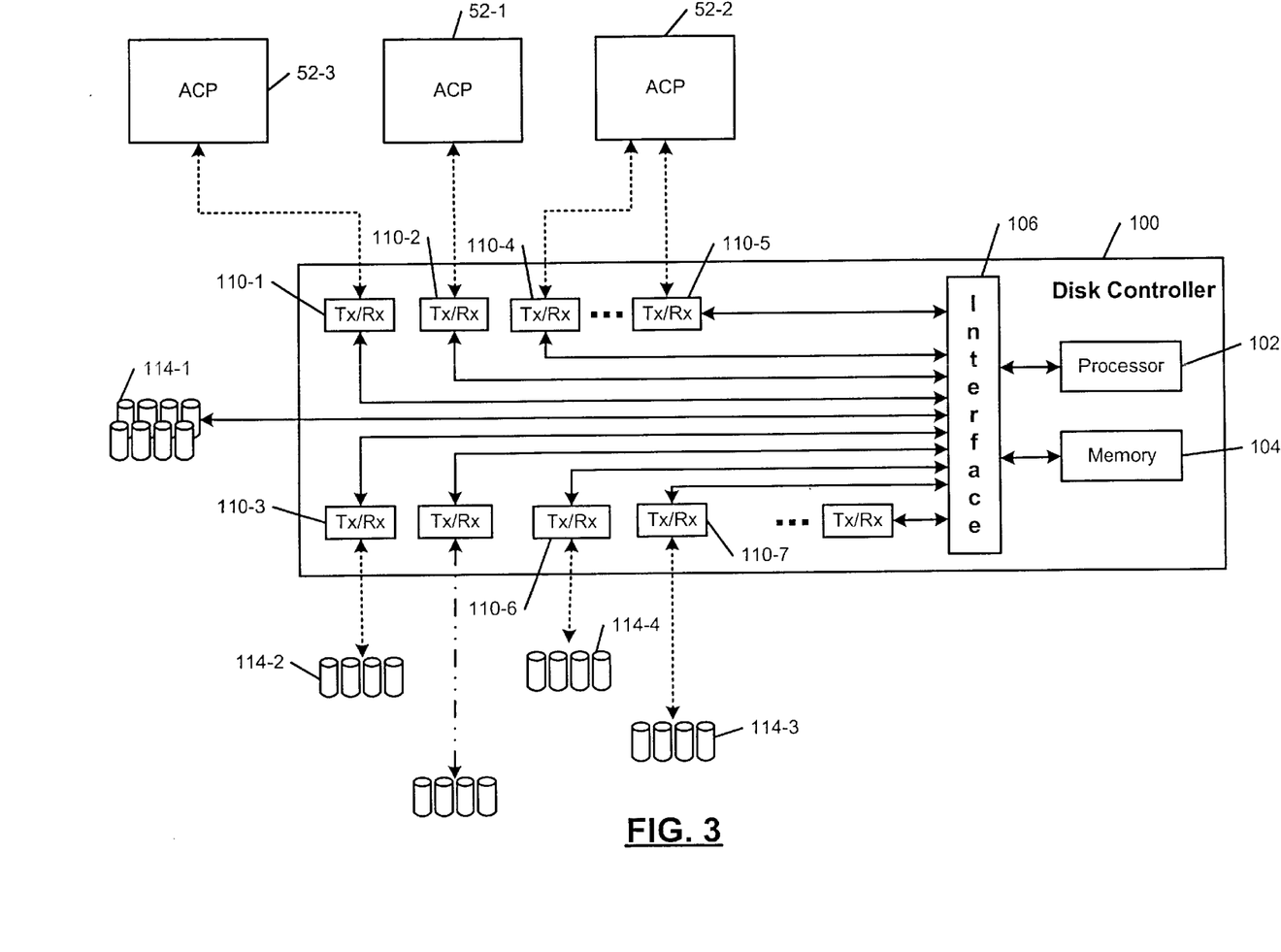
FIG. 3 is a functional block diagram of a disk controller according to the present invention.

Referring now to FIG. 3, an exemplary disk controller 100 is shown and includes a processor 102, memory 104 and an input/output (I/O) interface 106. The I/O interface 106 is connected to a plurality of transceivers 110. The transceivers 110 include a party line transceiver 110-1 that receives and responds to recruitment requests. The disk controller 100 assigns available disk drives 114 in response to the recruitment request if the disk drives 114 are available.

For example, the ACP 52-1 requests access to a first amount of disk space via the party line transceiver 110-1 at a first data rate. The disk controller 100 responds to the ACP 52-1 with availability details and other information. If the ACP 52-1 accepts the services of the disk controller 100, the disk controller 100 assigns the transmitter 110-2 for ACP/disk controller communications, assigns the transmitter 110-3 for disk controller/disk drive communications and assigns the disk drives 114-1 (hardwired) and 114-2 (wireless).

Later, the ACP 52-2 requests access to a second amount of disk space on the party line transceiver 110-1 at a second data rate. The disk controller 100 responds favorably and the ACP 52-2 requests ownership. The disk controller 100 assigns the transmitters 110-4,110-5, 110-6 and 110-7 and the wireless disk drives 114-3 and 114-4. The transceivers 110-4 and 110-5 provide wireless links between the disk controller 100 and the ACP 52-2. The transceivers 110-7 and 110-6 provide wireless links between the disk controller 100 and the wireless disk drives 114-3 and 114-4.

Later, the ACP 52-3 requests access to a third amount of disk space on the party line transceiver 110-1 at a third data rate. The disk controller 100 is unable to assign sufficient transmitters 110 and/or disk drives 114 or is otherwise unable to meet the request. The disk controller 100 either sends a response denying the request or does not respond at all. As can be appreciated by skilled artisans, the ACP 52 may recruit one or more disk controllers 100 if needed. The capacity of disk controller 100 may also be owned by one ACP. In addition, a virtual storage device may be configured with multiple ACPs 52.

Figure 4:
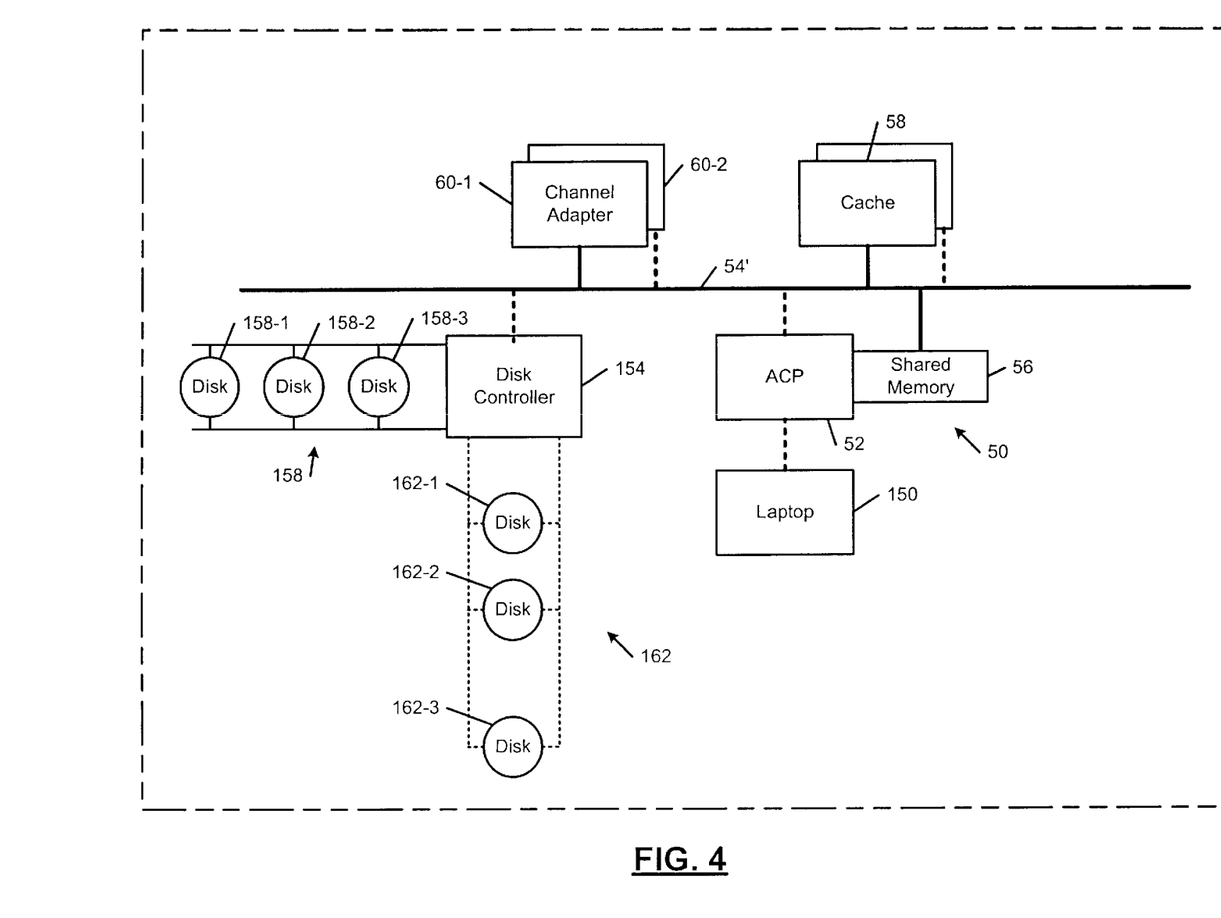
FIG. 4 is a functional block diagram of a first exemplary virtual storage device according to the present invention.

Referring now to FIG. 4, a recruitment method for an exemplary VDB is shown. For purposes of clarity, reference numerals from FIG. 2 have been used in FIG. 4 to identify similar elements. A host computer 150 such as a laptop computer transmits a wireless message on a common frequency. The wireless message requests a response from array-type base modules 50 that are available. The wireless message specifies that responding base modules 50 should use the frequency z GHz. If more than one base module 50 responds, the host computer 150 selects one or more of the base modules 50 depending upon the VDB. The selected base module 50 responds on the requested frequency z GHz and reports for duty. The host computer 150 downloads the VDB to the selected base module 50. The VDB includes the specifications for a 6 disk array with 1 GB cache and 512 MB shared memory. The host computer 150 inquires whether the base module 50 can build the disk array.

The base module 50 responds that is has sufficient cache memory 58 and shared memory 56. The base module 50 also responds that it will need to recruit a disk controller 100 and disk drives. The base module 50 wirelessly requests availability of disk controllers (DC) to respond on a private frequency at x GHz. A disk controller 154 (with serial number 111 at GPS location X/Y/Z) volunteers for duty. The disk controller 154 provides operational information such as upload bandwidth potential (e.g. 32 MB/s), capacity (e.g. 3 hard wired 73 GB disk drives 158-1,158-2, 158-3) and the capacity of the disk drives 158 (e.g. recruiting/servicing up to 32 disk drives) that are owned by the disk controller 154.

The base module 50 responds at x GHz that it would like to reserve the disk controller 154 if the disk controller 154 can recruit 3 more wireless disk drives 162 with 73 GB disks. The base module 50 instructs the disk controller 154 to respond when it has recruited the disk drives or timed out trying. The base module 50 may specify the amount of time that the disk controller 154 should wait before timing out. The disk controller 154 wirelessly requests available 73 GB disks to respond at y GHz. A disk drive 162-1 with 73 GB disk capacity and s/n 86 reports that it is available for duty. A disk drive 162-2 with 73 GB disk capacity and s/n 87 reports that it is available for duty. A disk drive 162-3 with 73 GB disk capacity and s/n 88 reports that it is available for duty.

The disk controller 154 responds to the base module 50 at x GHx that it has acquired the requested disk drive capacity and has tentative ownership of the disk drives. The base module 50 responds to the host computer 150 that the requested virtual storage device has been configured. In this example, there are wireless connections to the disk controller 154 and 3 of 6 (out of 32 possible) disk drives 162 of the disk controller 154.

Based on either signal strength or GPS information, the base module 50 estimates that the entire virtual storage device is within x meters of the base module 50. The base module 50 also reserves frequencies (x,y . . . z) for private use. By default, data encryption can be used or not used unless requested in the VDB.

The host computer 150 responds to the message from the base module 50 that the virtual storage device is available by securing ownership of all tentative wireless links. Operation of the virtual storage device as a disk array occurs thereafter. Optionally, the host computer 150 instructs the base module 50 to save all of the information that is needed to automatically reestablish the virtual storage device after a re-boot or power failure in rewritable nonvolatile memory. Preferably the base module 50 allows alterations to be made using security such as a secret password. Alternately, the base module 50 is physically reset using a configuration reset button.

Figure 5:
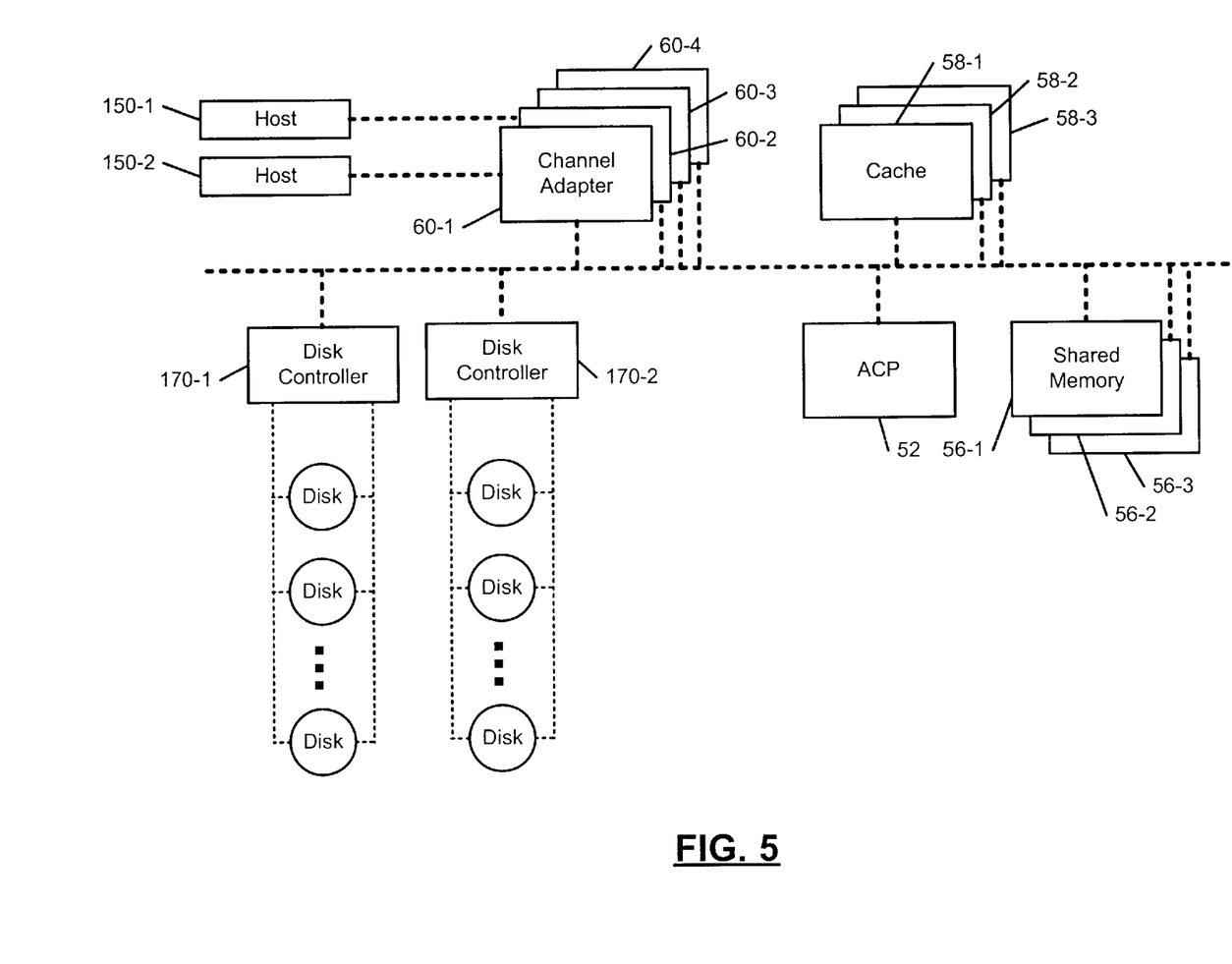
FIG. 5 is a functional block diagram of a second exemplary virtual storage device according to the present invention.

Referring now to FIG. 5, reference numbers from FIG. 4 are used in FIG. 5 to identify similar elements. The base module 50 includes wireless links between base components (56-1, 58-1, 60-1) thereof. The base module 50 has added additional cache memory (58-2 and 58-3), channel adapters (60-2, 60-3, and 60-4), shared memory (56-2 and 56-3) and disk controllers (170-1 and 170-2) through the methods described above. One or more host computers 150-1 and 150-2 are connected via the channel adapters 60-1, 60-2, 60-3 and 60-4.

The scaling of the virtual storage device is limited by the size and capability of the base module 50, the availability and range of volunteering (unused) components, and the availability of wireless frequencies in the vicinity. For example, the base module 50 is manufactured with the ability to access up to 1000 disks at optimal performance (where speed is as important as capacity) or up to 5000 disks (where capacity is more important than speed).

In a virtual device data center, the number of hot spare disks for repair or iCOD is dramatically reduced because a single group of components can wirelessly serve an entire data center. The virtual storage device allows for a significant improvement in equipment utilization and a significant decrease in the amount of non-revenue generating iCOD equipment that must be kept on site.

Figure 6:
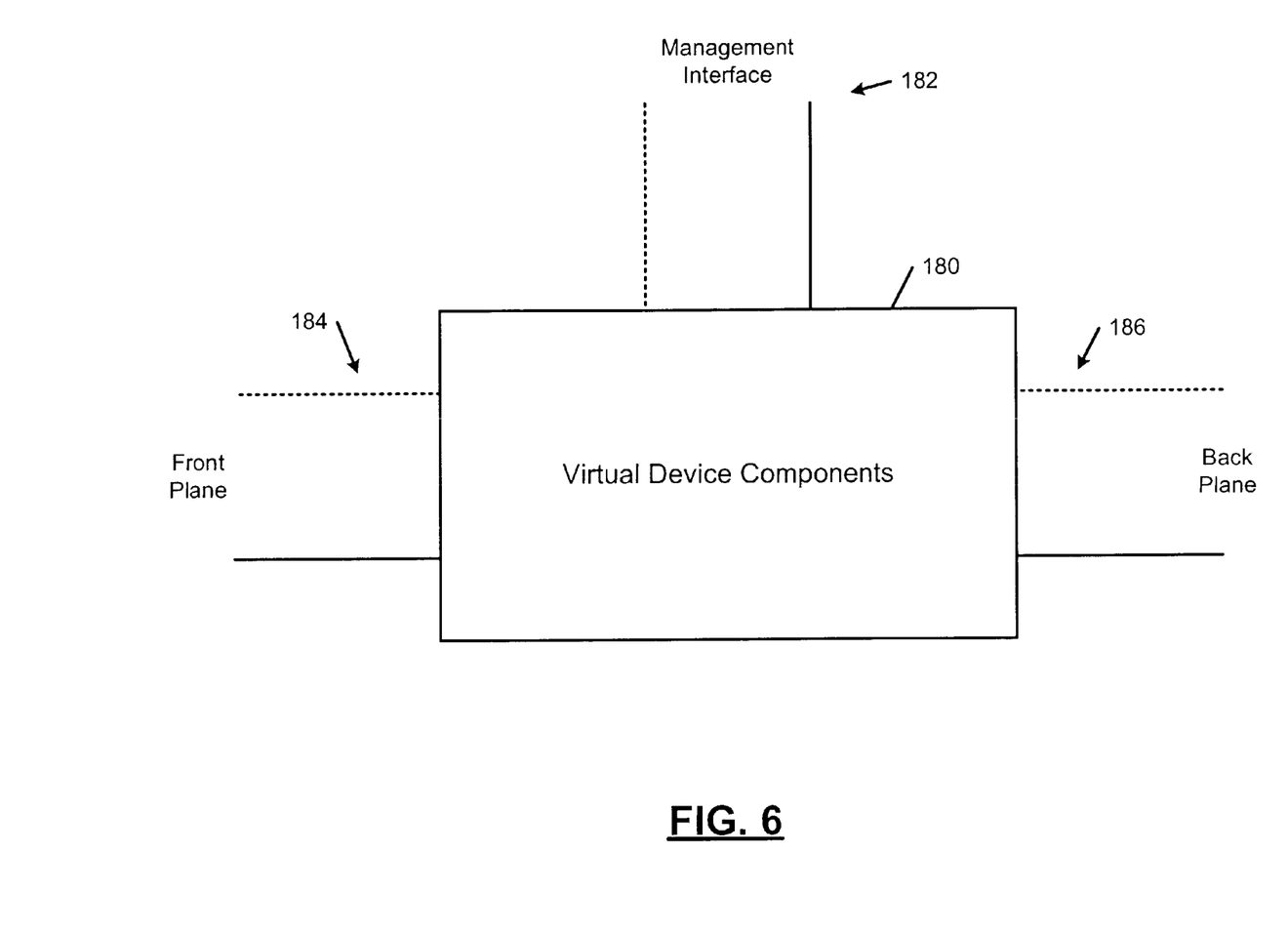
FIG. 6 is a functional block diagram of an interface for components of the virtual devices according to the present invention.

Referring now to FIG. 6, components 180 of the virtual device can provide increased levels of granularity if each of the components 180 is provided with a management interface 182, a front plane interface 184 and a back plane interface 186. Each of the interfaces includes hardwired and/or wireless communication links. The management interface 182 entering the component 180 allows a management platform such as Tivoli or Open View to monitor the health and performance of individual component 180 and to increase the ability of the virtual storage or computing device to diagnose potential failures and resolve bottlenecks.

Cache memory is quickly added/removed as necessary if the disk arrays have at least one wireless virtual device cache memory component. Instant cache sharing is also possible. Instead of two disk arrays sharing data over a serialized hardwired link, the disk arrays pass control of the cache memory back and forth. Depending on the sensitivity of the data and whether the transceivers use encryption, the cache memory swapping can take place at metropolitan distances (in either point to point or multicast modes). The ability to use cache memory in this manner significantly improves data backup, data mirroring and data migration.

If a disk drive fails, the disk controller substitutes a local hardwired disk drive or obtains a remote wireless disk drive from a shared pool. If the secure wireless connection between the disk controller and the cache memory is severed and re-connected to another disk array (either in the same data center or across town), a huge (e.g. 2 Terabyte TB) data migration can be accomplished almost immediately. Sending 2 TB of data over an optical serial link would otherwise take a long time. If the disk controller and the disk drives are being loaned on a temporary basis, internal disk copying (which is much faster than remote copying) is employed prior to returning the 2 TB disk array to the original owner.

Conventional disk controllers (or cache memory or shared memory) have to be physically plugged in, re-cabled and configured. The virtual storage device according to the present invention allows a bank of standby disk controllers, cache memory, disk drives, and shared memory to be monitored for health and put into service at any time. Management, mirroring and backup software have access to special frequencies and key codes to allow individual component disconnection and connection (taking with it everything it owns) without requiring the entire virtual device to be dissolved. This ability allows significantly higher uptime of the virtual device. Conventional data centers require raised floors for inter-connecting cables and have unused dead space above 2 meters. Virtual device data centers would not require raised floors and could use virtually all the vertical space up to the ceiling.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A virtual storage and computing device comprising:

an array control processor that stores a virtual device blueprint and includes a transceiver; and shared memory that is linked to said array control processor wherein said array control processor uses a wireless link to request additional resources from at least one component selected from the group of disk controllers, disk drives, cache memory, shared memory and channel adapters to assemble a virtual device described by said virtual device blueprint.

2. The virtual storage and computing device of claim 1 further comprising cache memory that is linked to said array control processor.

3. The virtual storage and computing device of claim 2 wherein said shared memory and said cache memory are linked by hardwired connections to said array control processor.

4. The virtual storage and computing device of claim 2 wherein said shared memory and said cache memory are linked by wireless connections to said array control processor.

5. The virtual storage and computing device of claim 1 wherein said virtual device blueprint defines a disk array.

6. The virtual storage and computing device of claim 1 wherein said array control processor includes firmware that stores said virtual device blueprint.

7. The virtual storage and computing device of claim 1 wherein said array control processor receives said virtual device blueprint from a host computer that is linked to said array control processor using a channel adapter.

8. The virtual storage and computing device of claim 1 wherein said array control processor receives said virtual device blueprint via a wireless link between a host computer and said array control processor.

9. The virtual storage and computing device of claim 1 wherein said array control processor transmits a request for a disk controller having first specifications, wherein first and second disk controllers respond to said request and meet said first specifications, and wherein said array control processor selects one of said first and second disk controllers.

10. The virtual storage and computing device of claim 9 wherein said array control processor selects one of said first and second disk controllers based on transmission power requirements of said first and second disk controllers.

11. The virtual storage and computing device of claim 1 wherein said array control processor transmits a first request for a disk controller having first specifications, wherein a third disk controller responds to said request by indicating availability of said third disk controller and indicating that said third disk controller does not meet said first specifications, and wherein said third disk controller transmits a second request for available disk drives.

12. The virtual storage and computing device of claim 11 wherein said first request is made on a shared frequency that is shared by multiple disk controllers and wherein said first request contains a second frequency for disk controllers that respond.

13. The virtual storage and computing device of claim 1 wherein said array control processor requests service from a disk controller having disk drives linked by at least one of hardwired and wireless connections.

14. A method for providing a virtual storage and computing device comprising:

storing a virtual device blueprint in an array control processor;

providing a transceiver;

linking shared memory to said array control processor; and using a wireless link to request additional resources from at least one component selected from the group of disk controllers, disk drives, cache memory, shared memory and channel adapters to assemble a virtual device described by said virtual device blueprint.

15. The method of claim 14 further comprising linking cache memory to said array control processor.

16. The method of claim 15 further comprising using hardwired links to connect said shared memory and said cache memory to said array control processor.

17. The method of claim 15 further comprising wirelessly linking said shared memory and said cache memory to said array control processor.

18. The method of claim 14 wherein said virtual device blueprint defines a disk array.

19. The method of claim 14 further comprising storing said virtual device blueprint in firmware of said array control processor.

20. The method of claim 14 further comprising receiving said virtual device blueprint at said array control processor from a host computer that is connected to said array control processor using a channel adapter.

\* \* \* \* \*